June 8, 1926.　　　　　A. E. JERRAM　　　　　1,588,373
AXLE AND WHEEL CONNECTION
Filed Oct. 29, 1921
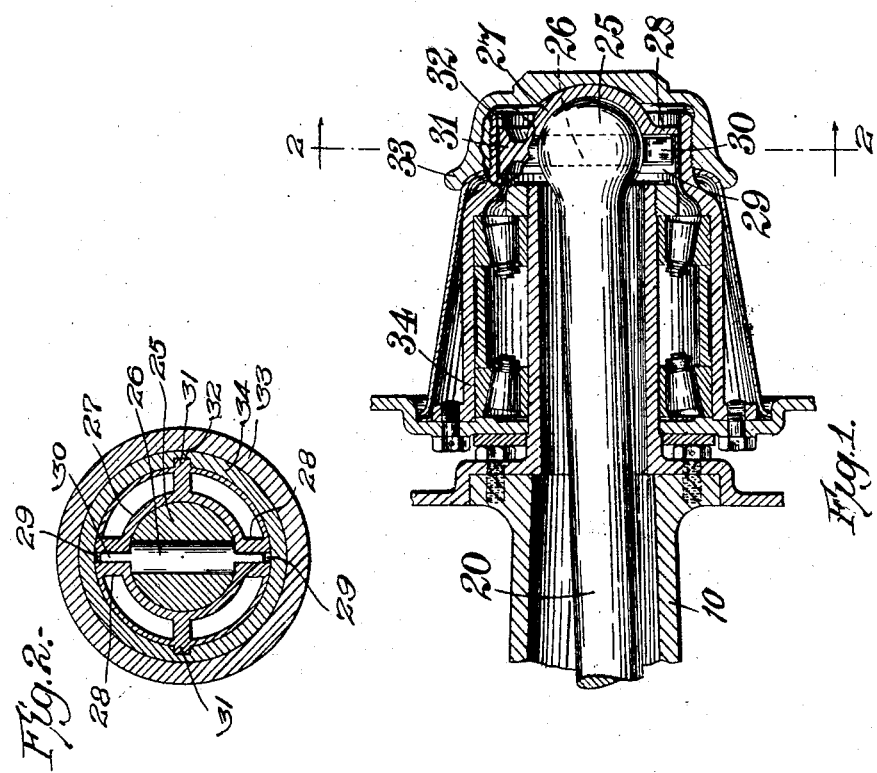
Inventor
A.E. Jerram,
by Wilkinson & Ginsta
Attorneys.

Patented June 8, 1926.

1,588,373

UNITED STATES PATENT OFFICE.

ARTHUR ERNEST JERRAM, OF LEICESTER, ENGLAND.

AXLE AND WHEEL CONNECTION.

Application filed October 29, 1921, Serial No. 511,244, and in Great Britain November 2, 1920.

This invention relates to the back axles of motor-driven vehicles, and has for its main object to provide an improved construction of driving connection between such an axle having spherical ends and the wheel-hubs to be driven thereby.

According to the invention there is provided the combination with a back axle having a spherical end, and a wheel-hub to be driven thereby, of a hemispherical socket surrounding said end and having two open-ended slots at opposite sides of the axle, and a pin extending through said spherical end into said slots, which socket has two outwardly directed radial projections that lie at right-angles to the pin, and the hub has two slots in its inner periphery at opposite sides of the socket which are rotatively engaged each by one of the said projections and are entered thereby from an end face of the hub.

One embodiment of the invention is illustrated in the accompanying drawing wherein:

Figure 1 is a fragmentary horizontal section through an axle housing and wheel hub, showing a connection between the axle and wheel in accordance with the present invention, and Figure 2 is a transverse section taken through the same on the line 2—2 of Figure 1.

Like reference numerals designate like parts in both views.

Referring to the drawings, the drive is transmitted to the road-wheels as illustrated in the case of the shaft 20, the wheel-hub being designated 34. The shaft 20 terminates in a spherical or ball end 25 provided with a diametrical opening to receive a pin 26. This ball end 25 is received within a hemispherical casing 27 which is provided with lugs 28 extending from opposite ends of the diameter thereof. These lugs are slotted as at 29 to receive the flattened ends 30 of the pin 26 aforesaid. The member 27 is further provided with diametrically opposite ribs 31 to engage slots 32 formed on the inner surface of the end of the hub 34. The projections 28 and 31 on the member 27 lie at right-angles to one another so as to provide the necessary freedom of movement as a universal joint; a broken section is shown in Figure 1 to illustrate the part 31.

The cup-member 27 bears against the ball end 25 of the shaft 20 and is held in contact therewith by a hub-cap 33 which is screwed on to the hub 34 and retains all the parts in position.

If it is desired to replace any part of the back-axle, it is only necessary to unscrew the hub-cap 33, slide the hemispherical member 27 out from engagement with its grooves 32, and withdraw the shaft 20 through the wheel hub.

What I claim as my invention and desire to secure by Letters Patent is:—

The combination with a back axle having a spherical end and a wheel-hub to be driven thereby, of a hemispherical socket surrounding said end and having two open-ended slots at opposite sides of the axle, and a pin extending through said spherical end and into said slots, said socket having two outwardly directed radial projections that lie at right-angles to said pin, and said hub having two slots in its inner periphery at opposite sides of said socket whch are rotatively engaged each by one of said projections, and are entered thereby from an end face of the hub, substantially as described.

In testimony whereof I affix my signature.

ARTHUR ERNEST JERRAM.